United States Patent
Chaouk et al.

(10) Patent No.: US 6,225,367 B1
(45) Date of Patent: May 1, 2001

(54) POLYMERS

(75) Inventors: Hassan Chaouk, Brighton; Timothy Charles Hughes, Ferntree Gully; John Stuart Wilkie, Viewbank; Gordon Francis Meijs, Murrumbeena, all of (AU)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 09/397,282

(22) Filed: Sep. 16, 1999

(30) Foreign Application Priority Data

Sep. 15, 1998 (EP) .................................. 98117421

(51) Int. Cl.⁷ ............................ A61K 9/14; C08F 283/00
(52) U.S. Cl. ..................... 521/149; 528/367; 528/369; 528/373; 528/398; 528/498; 525/535; 525/538; 525/539; 525/540; 521/50; 521/82; 521/154; 521/159; 424/497
(58) Field of Search ..................... 528/367, 369, 528/373, 398, 401; 525/535, 538, 539, 540; 521/50, 82, 154, 155; 424/486, 497

(56) References Cited

U.S. PATENT DOCUMENTS

| | | | |
|---|---|---|---|
| 3,953,566 | * | 4/1976 | Gore ..................................... 264/288 |
| 4,440,918 | * | 4/1984 | Rice et al. ............................ 526/246 |
| 4,799,931 | * | 1/1989 | Lindstrom ............................... 623/5 |
| 4,818,801 | * | 4/1989 | Rice et al. ........................... 526/247 |
| 5,238,613 | * | 8/1993 | Anderson ............................... 264/22 |
| 5,244,799 | * | 9/1993 | Anderson ........................ 435/240.23 |

FOREIGN PATENT DOCUMENTS

| | | |
|---|---|---|
| 0 810 239 A2 | 7/1992 | (EP) . |
| 0 533 159 A1 | 9/1992 | (EP) . |
| WO 96/31548 | 3/1996 | (WO) . |
| WO 97/00274 | 6/1996 | (WO) . |
| WO 97/32906 | 3/1997 | (WO) . |
| WO 97/35905 | 3/1997 | (WO) . |

OTHER PUBLICATIONS

European Search Report.

* cited by examiner

*Primary Examiner*—Samuel A. Acquah
(74) *Attorney, Agent, or Firm*—Scott Meece; Robert J. Gorman, Jr.

(57) ABSTRACT

The present invention relates to polymers comprising one or more perfluoroalkylpolyether units and one or more different charged units, to a process for producing such polymers in non-porous or particularly in porous form and to mouldings composed thereof.

The novel polymers have an improved wettability and cell growth ability and are thus useful, for example, for the manufacture of biomedical devices, in particular opthalmic devices.

22 Claims, No Drawings

POLYMERS

The present invention relates to novel biocompatible polymers, in particular copolymers of a perfluoroalkylpolyether macromer and a charged monomer, and products formed therefrom, for example membranes or optical devices and implants.

Perfluoroalkylpolyether (PFPE) polymers and ophthalmic applications thereof are known, for example, from PCT applications WO 96/31548, WO 97/35905 and WO 97/35906. The documents disclose the ability of PFPEs to support the cell growth and attachment of corneal epithelium cells both invivo and invitro. The polymer-tissue interface responsible for determining the level of protein deposition and cell growth support can be manipulated by plasma coating which can subsequently be attached with biological proteins such as collagen or polysaccharides such as dextran. However, this technique is essentially limited to surface modification but is unable to affect the internal surface area of the polymer, which is an important drawback especially in case of porous polymers. Therefore, events such as excessive protein or lipid deposition are difficult to control once they have diffused past the surface. The problem is magnified in the case of porous polymers by the large surface area to volume ratio that exists within the porous structure giving the protein or lipid etc. ample area onto which it can deposit.

It now has surprisingly been found that novel PFPE polymers with an improved wettability and cell growth ability and a considerably reduced tendency to accumulate protein or lipid deposits on the surface are obtained if a suitable PFPE macromer is copolymerized with one or more different charged monomers.

The present invention therefore in one aspect relates to a polymer comprising one or more perfluoroalkylpolyether units and one or more charged units selected from the group consisting of zwitter-ionic units and a mixture of anionic and cationic units.

It will be understood by those skilled in the art that the terms "perfluoroalkylpolyether unit" and "PFPE unit" mean preferably a moiety of formula $$—OCH_2CF_2O\ (CF_2CF_2O)_x(CF_2O)_yCF_2CH_2O— \quad (1)$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 8000 and preferably from 242 to 4000. Preferably x in formula (1) is in the range of from 0 to 20, more preferably in the range from 8 to 12, and y is in the range from 0 to 25, more preferably in the range from 10 to 14. Even more preferred, x and y in formula (1) are both different from zero such that x is in the range of from 1 to 20, more preferably in the range from 8 to 12, and y is in the range from 1 to 25, more preferably in the range from 10 to 14.

Suitable charged units are, for example, a mixture of separate anionic and cationic units, or preferably zwitterionic units comprising one anionic and one cationic group each.

Suitable charged units correspond, for example, to formula

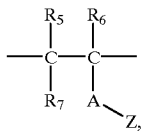

(2)

wherein either (i) two of the three variables $R_5$, $R_6$ and $R_7$ are hydrogen and the third one is hydrogen, carboxy, carboxymethyl or $C_1$–$C_4$-alkyl; or (ii) $R_5$ and $R_6$ together with the adjacent carbon atoms form a 5- to 7-membered cycloaliphatic or heterocyclic ring and $R_7$ is hydrogen; or (iii) $R_5$ and $R_6$ are each hydrogen and $R_7$ and A together with the adjacent carbon atoms form a 5- to 7-membered cycloaliphatic or heterocyclic ring; or (iv) $R_5$ and $R_7$ are each hydrogen and $R_6$ and A together with the adjacent carbon atom form a 5- to 7-membered cycloaliphatic or heterocyclic ring;

A is a direct bond or a functional group, for example a carbonyl, carbonate, amide, ester, dicarboanhydride, dicarboimide, urea or urethane group; and Z is an aliphatic, cycloaliphatic or heterocyclic moiety comprising an anionic group or a cationic group or one anionic and one cationic group each.

A group of preferred units of formula (2) corresponds to formula

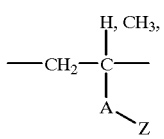

(2a)

wherein

A is a direct bond or an above-mentioned functional group, preferably a carbonyl, ester or amide functional group and more preferably an ester group —C(O)—O—.

A further group of suitable units of formula (2) corresponds to formula

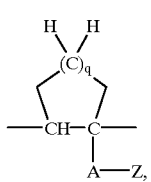

(2b)

wherein q is an integer of 2 or preferably 1, and A and Z are as defined above.

Still a further group of suitable units of formula (2) corresponds to formula

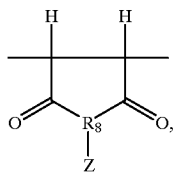

(2c)

wherein $R_8$ is oxygen or preferably nitrogen and Z is as defined before.

Still a further group of suitable units of formula (2) corresponds to formula

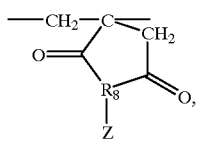

(2d)

wherein $R_8$ and Z are as defined before.

Suitable anionic groups of the moiety Z are, for example, —COO$^-$, —SO$_3^-$, —OSO$_3^-$, —OPO$_3$H$^-$, —OPO$_2^-$OR$_{11}$ or bivalent —O—PO$_2^-$—O—, wherein $R_{11}$ is, for example, $C_1$–$C_{12}$-alkyl, preferably $C_2$–$C_8$-alkyl and in particular $C_3$–$C_6$-alkyl; preferably a group —SO$_3^-$, —OPO$_2^-$OR$_{11}$ or a bivalent group —O—PO$_2^-$—O—, wherein $R_{11}$ is as defined above; and in particular a group —SO$_3^-$.

Suitable cationic groups of the moiety Z are for example a group —NRR'R"$^+$ or a bivalent group —NRR'$^+$—, wherein R, R' and R" may be the same or different and are each independently of the other, for example, hydrogen or $C_1$–$C_{24}$-alkyl, preferably hydrogen or $C_1$–$C_4$-alkyl and most preferably each methyl or ethyl.

A group of preferred moieties Z are cationic ones wherein Z comprises one of the above-mentioned cationic groups. Another group of preferred moieties Z are anionic ones wherein Z comprises one of the above-mentioned anionic groups. Z is more preferably a zwitter-ionic moiety which comprises one of the above-mentioned anionic and cationic groups each.

The moiety Z is for example unfluorinated or fluorinated $C_2$–$C_{30}$-alkyl, preferably unfluorinated $C_2$–$C_{12}$-alkyl, and more preferably unfluorinated $C_3$–$C_8$-alkyl, which is in each case uninterrupted or interrupted by —O— and substituted and/or interrupted by one or two of the above-mentioned anionic and cationic groups. Z is preferably $C_2$–$C_{12}$-alkyl and even more preferably $C_3$–$C_8$-alkyl which is substituted and/or interrupted by one of the above-mentioned anionic and cationic groups each.

Z as a cycloaliphatic or heterocyclic moiety is, for example, a radical of formula -[(alk)-(R$_9$)$_s$]$_t$-R$_{10}$ (3), wherein (alk) is $C_1$–$C_{12}$-alkylene, preferably $C_1$–$C_4$-alkylene, s is 0 or 1, t is 0 or preferably 1, $R_9$ is for example —O— or —NH—, and $R_{10}$ is a 5- to 7-membered cycloaliphatic or heterocyclic ring, preferably a 5- or 6-membered heterocyclic ring, which is in each case substituted and/or interrupted by one or two of the above-mentioned anionic and cationic groups. Z is preferably a zwitter-ionic moiety of formula (3), wherein (alk) and t have the above-given meanings and $R_9$ is a heterocyclic 5- or 6-membered ring comprising a bivalent group —NRR'$^+$— and one of the above mentioned anionic groups, preferably a carboxy group.

Preferred charged units of the invention are zwitter-ionic units of formula (2a), wherein A is a carbonyl, ester or amide group, Z is $C_2$–$C_{12}$-alkyl which is substituted by —NRR'R"$^+$, —COO$^-$, —SO$_3^-$, —OSO$_3^-$, —OPO$_2^-$OR$_{11}$ or —OPO$_3$H$^-$ and/or is interrupted by a group —NRR'$^+$— or —O—PO$_2^-$—O—, R, R' and R" are each independently of the other hydrogen or $C_1$–$C_{12}$-alkyl and $R_{11}$ is $C_1$–$C_{12}$-alkyl, with the proviso that Z contains one anionic and one cationic group each.

A preferred group of zwitter-ionic units corresponds to the above formula (2a), wherein -A-Z is a radical of formula —C(O)O-alk-NRR'$^+$-alk'-An$^-$ (3a)

or

—C(O)O-alk-O—PO$_2^-$—O-alk'-NRR'R"$^+$ (3b), wherein

R, R' and R" may be the same or different and are each independently of the other hydrogen or $C_1$–$C_{12}$-alkyl, preferably $C_1$–$C_4$-alkyl and more preferably methyl or ethyl; alk and alk' may be the same or different and are each independently of the other $C_1$–$C_{12}$-alkylene, preferably $C_1$–$C_8$-alkylene, more preferably $C_1$–$C_6$-alkylene and most preferably $C_1$–$C_4$-alkylene; and An$^-$ is an anionic group —COO$^-$, —SO$_3^-$, —OSO$_3^-$, —OPO$_2^-$OR$_{11}$ or —OPO$_3$H$^-$, preferably —COO$^-$, —OPO$_2^-$OR$_{11}$ or —SO$_3^-$, more preferably —OPO$_2^-$OR$_{11}$ or —SO$_3^-$ and most preferably —SO$_3^-$ wherein $R_{11}$ is $C_1$–$C_{12}$-alkyl, preferably $C_2$–$C_8$-alkyl or in particular $C_3$–$C_6$-alkyl. An even more preferred group of zwitter-ionic units corresponds to the above formula (3a), wherein the above-given meanings and preferences apply to the variables contained therein.

In a further embodiment of the invention the polymer comprises a mixture of anionic and cationic units, for example, each of formula (2a), wherein for A and Z the above given meanings and preferences apply, with the proviso that the anionic units Z comprise one of the above given anionic groups, and the cationic units comprise one of the above given cationic groups.

The polymers of the invention are obtainable, for example, by copolymerizing one or more macromonomers comprising at least one PFPE unit and at least one polymerizable charged monomer or a precursor thereof, and, if a charged monomer precursor has been used, converting the precursor units into charged units after the copolymerization reaction. Preferably, the PFPE macromonomer is copolymerized with a mixture of one cationic and one anionic monomer each or in particular is copolymerized with a zwitter-ionic monomer.

Preferred macromonomers having at least one perfluoropolyether unit include, but are not limited to, those of formula (4), (5) and (6) as specified hereinafter:

Q-(PFPE-L)$_{n-1}$-PFPE-Q (4),

Q-B-(L-B)$_n$-T (5),

Q-PFPE-L-M-L-PFPE-Q (6), wherein in these formulae

Q may be the same or different and is a polymerizable group,

PFPE is a divalent residue of formula (1) as hereinbefore defined,

L is a difunctional linking group;

n is at least 1;

each B may be the same or different and is a difunctional block of molecular weight in the range of from 100 to 4000 and wherein at least one B is a perfluorinated polyether of formula (1);

T is a univalent terminal group which is not polymerisable by free radicals but which may contain other functionality; and M is a residue from a difunctional polymer or copolymer comprising silicone repeat units of formula (7) having a molecular weight preferably in the range of from 180 to 6000 and end functionality as described below

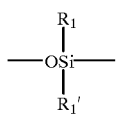

(7)

wherein $R_1$ and $R_1'$ may be the same or different and are selected from the group consisting of hydrogen, alkyl, aryl and halosubstituted alkyl and in particular $C_1$–$C_8$-alkyl, phenyl and $C_1$–$C_8$-haloalkyl. $R_1$ and $R_1'$ are preferably methyl.

In the above formulae (4), (5) and (6), respectively, the following definitions apply:

It is preferred that n is in the range of from 1 to 5, more preferably n is in the range of from 1 to 3. Macromonomers where n is 1 are particularly preferred.

Q is a polymerizable group which preferably comprises an ethylenically unsaturated moiety which can enter into a free radical polymerization reaction. Preferably Q is a group of the formula

(8)

wherein $P_1$ is a free-radically-polymerizable group;

Y is —CONHCOO—, —CONHCONH—, —OCONHCO—, —NHCONHCO—, —NHCO—, —CONH—, —NHCONH—, —COO—, —OCO—, —NHCOO— or —OCONH—;

m and p, independently of one another, are 0 or 1;

$R_2$ is a divalent radical of an organic compound having up to 20 carbon atoms; and $X_1$ is, for example, a direct bond or a group —NHCO— or —CO—.

A free-radically-polymerizable group $P_1$ is, for example, alkenyl, alkenylaryl or alkenylarylenealkyl having up to 20 carbon atoms. Examples of alkenyl are vinyl, allyl, 1-propen-2-yl, 1-buten-2-, -3- and 4-yl, 2-buten-3-yl, and the isomers of pentenyl, hexenyl, octenyl, decenyl and undecenyl. Examples of alkenylaryl are vinylphenyl, vinylnaphthyl or allylphenyl. An example of alkenylarylenealkyl is o-, m-, or p-vinylbenzyl.

$P_1$ is preferably alkenyl or alkenylaryl having up to 12 carbon atoms, particularly preferably alkenyl having up to 8 carbon atoms, in particular alkenyl having up to 4 carbon atoms.

Y is preferably —COO—, —OCO—, —NHCONH—, —NHCOO—, —OCONH—, NHCO— or —CONH—, particularly preferably —COO—, —OCO—, NHCO— or —CONH—, and in particular, —COO— or —CONH—.

$X_1$ is preferably —NHCO—.

In a preferred embodiment, the indices, m and p, are not simultaneously zero. If p is zero, m is preferably 1.

$R_2$ is preferably alkylene, arylene, a saturated bivalent cycloaliphatic group having 6 to 20 carbon atoms, arylenealkylene, alkylenearylene, alkylenearylenealkylene or arylenealkylenearylene.

Preferably, $R_2$ is a divalent radical having up to 12 carbon atoms, particularly preferably a divalent radical having up to 8 carbon atoms. In a preferred embodiment, $R_2$ is furthermore alkylene or arylene having up to 12 carbon atoms. A particularly preferred embodiment of $R_2$ is lower alkylene, in particular lower alkylene having up to 4 carbon atoms.

It is particularly preferred that Q be selected from the group consisting of acryloyl, methacryloyl, styryl, acrylamido, acrylamidoalkyl, acryloyloxyalkylaminocarbonyl or any substituted derivatives thereof. Most preferably Q is a compound of formula (8) wherein $P_1$ is alkenyl of up to 4 carbon atoms, Y is —COO—, $R_2$ is alkylene of 2 to 4 carbon atoms, $X_1$ is —NHCO— and m and p are each one, and is in particular the radical $CH_2$=$C(CH_3)$—C(O)O—$(CH_3)_2$—NH—C(O)—.

The above given radicals Y and X, are to be understood that in case of Y the left bond is directed to the radical $P_1$ and the right bond is directed to the group ($R_2$-$X_1$) or PFPE, and in case of $X_1$ the left bond is directed to $R_2$ and the right bond is directed to PFPE.

The linking group L may be the bivalent residue of any difunctional moiety able to react with hydroxyl. Suitable precursors to L are α, ω-diepoxides, α, ω-diisocyanates, α, ω-diisothiocyanates, α, ω-diacylhalides, α, ω-dithioacylhalides, α, ω-dicarboxylic acids, α, ω-dithiocarboxylic acids, α, ω-dianhydrides, α, ω-dithioisocyanates, α, ω-dilactones, α, ω-dialkylesters, α, ω-dihalides, α, ω-dialkylethers, α, ω-dihydroxymethylamides. It is preferred that the linking group be a bivalent residue —C(O)—NH—$R_3$—NH—C(O)— of a diisocyanate or the corresponding residue of a dithioisocyanate, wherein $R_3$ is a divalent organic radical having up to 20 carbon atoms.

The divalent radical $R_3$ is, for example, alkylene, arylene, alkylenearylene, arylenealkylene or arylenealkylenearylene having up to 20 carbon atoms, a saturated bivalent cycloaliphatic group having 6 to 20 carbon atoms or cycloalkylenealkylenecycloalkylene having 7 to 20 carbon atoms.

In a preferred embodiment, $R_3$ is alkylene, arylene, alkylenearylene, arylenealkylene or arylenealkylenearylene having up to 14 carbon atoms or a saturated divalent cycloaliphatic group having 6 to 14 carbon atoms. In a particularly preferred embodiment, $R_3$ is alkylene or arylene having up to 12 carbon atoms or a saturated bivalent cycloaliphatic group having 6 to 14 carbon atoms.

In a preferred embodiment, $R_3$ is alkylene or arylene having up to 10 carbon atoms or a saturated bivalent cycloaliphatic group having 6 to 10 carbon atoms.

In a particularly preferred meaning, $R_3$ is a radical derived from a diisocyanate, for example from hexane 1,6-diisocyanate, 2,2,4-trimethylhexane 1,6-diisocyanate, tetramethylene diisocyanate, phenylene 1,4-diisocyanate, toluene 2,4-diisocyanate, toluene 2,6-diisocyanate, m- or p-tetramethylxylene diisocyanate, isophorone diisocyanate or cyclohexane 1,4-diisocyanate.

Aryl is a carbocyclic aromatic radical which is unsubstituted or substituted preferably by lower alkyl or lower alkoxy. Examples are phenyl, tolyl, xylyl, methoxyphenyl, t-butoxyphenyl, naphthyl and phenanthryl.

Arylene is preferably phenylene or naphthylene, which is unsubstituted or substituted by lower alkyl or lower alkoxy, in particular 1,3-phenylene, 1,4-phenylene or methyl-1,4-phenylene, 1,5-naphthylene or 1,8-naphthylene.

A saturated bivalent cycloaliphatic group is preferably cycloalkylene, for example cyclohexylene or cyclohexylene (lower alkylene), for example cyclohexylenemethylene, which is unsubstituted or substituted by one or more lower alkyl groups, for example methyl groups, for example trimethylcyclohexylenemethylene, for example the bivalent isophorone radical.

For the purposes of the present invention, the term "lower" in connection with radicals and compounds, unless defined otherwise, denotes, in particular, radicals or compounds having up to 8 carbon atoms, preferably having up to 4 carbon atoms.

Lower alkyl has, in particular, up to 8 carbon atoms, preferably up to 4 carbon atoms, and is, for example, methyl, ethyl, propyl, butyl, tert-butyl, pentyl, hexyl or isohexyl.

Alkylene has up to 12 carbon atoms and can be straight-chain or branched. Suitable examples are decylene, octylene, hexylene, pentylene, butylene, propylene, ethylene, methylene, 2-propylene, 2-butylene, 3-pentylene, and the like.

Lower alkylene is alkylene having up to 8 carbon atoms, particularly preferably up to 4 carbon atoms. Particularly preferred meanings of lower alkylene are propylene, ethylene and methylene.

The arylene unit in alkylenearylene or arylenealkylene is preferably phenylene, unsubstituted or substituted by lower alkyl or lower alkoxy, and the alkylene unit therein is preferably lower alkylene, such as methylene or ethylene, in particular methylene. These radicals are therefore preferably phenylenemethylene or methylenephenylene.

Lower alkoxy has, in particular, up to 8 carbon atoms, preferably up to 4 carbon atoms, and is, for example, methoxy, ethoxy, propoxy, butoxy, tert-butoxy or hexyloxy.

Arylenealkylenearylene is preferably phenylene(lower alkylene)phenylene having up to 8, in particular up to 4, carbon atoms in the alkylene unit, for example phenylene-ethylenephenylene or phenylenemethylenephenylene.

Some examples of preferred diisocyanates from which bivalent residues L are derived include trimethylhexamethylenediisocyanate (TMHMDI), isophorone diisocyanate (IPDI), methylenediphenyl diisocyanate (MDI) and 1,6-hexamethylenediisocyanate (HMDI).

The blocks B may be monomeric, oligomeric or polymeric. The molecular weights and chemical composition of each block B may be the same or different, provided that they fall within the molecular weight range specified above. The blocks B may be hydrophobic or hydrophilic, provided that at least one of the blocks is of formula (1). Other suitable blocks B may be derived from poly(alkylene oxides). When one or more of the blocks B is hydrophilic, these blocks are particularly preferably derived from poly (alkylene oxides), more preferably from poly(lower alkylene oxides), most preferred from the polyethylene glycols. it is most preferred that the B blocks are selected from blocks of formula (1) and poly(alkylene oxides), provided that at least one of the blocks is of formula (1). In two very preferred embodiments of the invention there are two B blocks in a macromonomer of formula (5) which are either both of formula (1), or one of which is of formula (1) while the other is derived from a poly(alkylene oxide), preferably from a poly(lower alkylene oxide), most preferred from polyethyl-ene glycols. "Derived from a poly(alkylene oxide)" in the context of the definition of the B blocks means that such a B block differs from a poly(alkylene oxide) in that the two terminal hydrogens have been abstracted from such poly (alkylene oxide). In order to exemplify this, B denotes, if derived from a polyethylene glycol, —(OCH$_2$CH$_2$)$_a$O— wherein a is the index indicating the number of repeating ethyleneoxy groups.

The terminal group T is a univalent terminal group which is not polymerizable by free radicals but which may contain other functionality. Preferred terminal groups are hydrogen, alkyl, substituted alkyl, aryl or substituted aryl. More preferred groups T are hydrogen, lower alkyl and phenyl.

Suitable substituents for Q or T may be selected from: alkyl, alkenyl, alkynyl, aryl, halo, haloalkyl, haloalkenyl, haloalkynyl, haloaryl, hydroxy, alkoxy, alkenyloxy, aryloxy, haloalkoxy, haloalkenyloxy, haloaryloxy, amino, alkylamino, alkenylamino, alkynylamino, arylamino, acyl, aroyl, alkenylacyl, arylacyl, acylamino, alkylsulphonyloxy, arylsulphenyloxy, heterocyclyl, heterocycyloxy, heterocycylamino, haloheterocyclyl, alkoxycarbonyl, alkylthio, alkylsulphonyl, arylthio, arylsulphonyl, aminosulphonyl, dialkylamino and dialkylsulphonyl, having up to 10 carbon atoms.

The difunctional polymer from which M is derived contains an independently selected terminal functionality at each end which may react with the precursor of the linking group L so that a covalent linkage is formed. The preferred terminal functionality is hydroxyl or amino. Such functionality may be joined to the siloxane units in M by means of an alkylene group or other non reactive spacer. Preferred terminal moieties are hydroxyalkyl, hydroxyalkoxyalkyl and alkylamino. Especially preferred hydroxyalkyls are hydroxypropyl and hydroxybutyl; especially preferred hydroxyalkoxyalkyls are hydroxyethoxyethyl and hydroxy-ethoxypropyl. Preferred R$_1$ and R$_1$' groups are methyl.

Preferred M residues in formula (6) as specified above are of formula

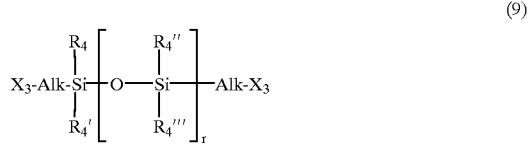

(9)

where
   r is an integer from 5 to 100; Alk is alkylene having up to 20 carbon atoms, uninterrupted or interrupted by oxygen; the radicals R$_4$, R$_4$', R$_4$" and R$_4$'", independently of one another, are alkyl, aryl or halosubstituted alkyl; and X$_3$ is —O— or —NH—.

In a preferred meaning, r is an integer from 5 to 70, particularly preferably 8 to 50, in particular 10 to 28.

In a preferred meaning, the radicals R$_4$, R$_4$', R$_4$" and R$_4$'" are, independently of one another, lower alkyl having up to 8 carbon atoms, particularly preferably lower alkyl having up to 4 carbon atoms, especially lower alkyl having up to 2 carbon atoms. In a further particularly preferred embodiment R$_4$, R$_4$', R$_4$" and R$_4$'" are each methyl.

Alkylene interrupted by oxygen is preferably lower alkylene-oxy-lower alkylene having up to 6 carbons in each of the two lower alkylene moieties, more preferably lower alkylene-oxy-lower alkylene having up to 4 carbons in each of the two lower alkylene moieties, examples being ethylene-oxy-ethylene or ethylene-oxy-propylene.

Halosubstituted alkyl is preferably lower alkyl substituted by one or more, especially up to three, halogens such as fluoro, chloro or bromo, examples being trifluoromethyl, chloromethyl, heptafluorobutyl or bromoethyl.

A preferred macromonomer is of formula (4) wherein n is in the range of from 2 to 5, L is a bivalent residue —C(O)—NH—$R_3$—NH—C(O)— of a diisocyanate wherein $R_3$ is alkylene, arylene, alkylenearylene, arylenealkylene or arylenealkylenearylene having up to 14 carbon atoms or a saturated divalent cycloaliphatic group having 6 to 14 carbon atoms, and Q is a compound of formula (8) wherein $P_1$ is alkenyl of 2 to 4 carbon atoms, Y is —COO—, $R_2$ is alkylene of 1 to 4 carbon atoms, $X_1$ is —NHCO— and m and p are each 1.

A preferred macromonomer of formula (4) is one in which n is in the range of from 2 to 5, L is the bivalent residue derived from trimethylhexamethylene diisocyanate (TMHMDI) and Q is the residue derived from isocyanatoethyl methacrylate.

A preferred embodiment of this invention is directed to a macromonomer of formula (10a):

wherein

PFPE is a perfluorinated polyether of formula (1) as herein defined, wherein x is in the range of from 8 to 10 and y is in the range of from 10 to 14, n>1, and $R_3$ is alkylene or arylene having up to 12 carbon atoms or a saturated bivalent cycloaliphatic group having 6 to 14 carbon atoms.

In a preferred embodiment of the present invention there is provided a macromonomer of formula (10b):

wherein

PFPE is a perfluorinated polyether of formula (1) as herein defined, n>1, $R_3$ is the trimethylhexamethylene component of TMHMDI, and wherein x is in the range of from 8 to 10 and y is in the range of from 10 to 14.

In a preferred embodiment of the present invention there are provided macromonomers of formula (5) which correspond to formulae (11) to (14)

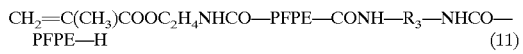
(11)

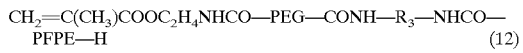
(12)

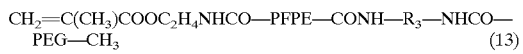
(13)

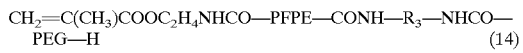
(14)

wherein

PFPE is of formula (1) wherein x and y are as defined hereinbefore, $R_3$ is alkylene, arylene, alkylenearylene, arylenealkylene or arylenealkylenearylene having up to 14 carbon atoms or a saturated divalent cycloaliphatic group having 6 to 14 carbon atoms, and PEG is the divalent radical of a polyethylene glycol. Preferably PEG has a molecular weight in the range of from 200 to 2000.

In an even more preferred embodiment of the present invention there are provided macromonomers of formulae (15) to (18):

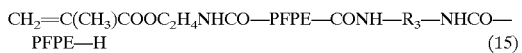
(15)

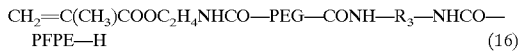
(16)

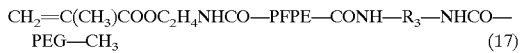
(17)

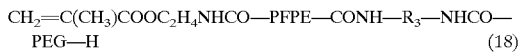
(18)

wherein

PFPE is of formula (1) wherein x and y are as defined hereinbefore, wherein $R_3$ is the trimethylhexamethylene component of TMHMDI, and PEG is the divalent radical of a polyethylene glycol. Preferably PEG has a molecular weight in the range of from 200 to 2000. It is also preferred in this embodiment that x is 10 and y is 12.

A preferred macromonomer of formula (6) is one in which the molecular weight of the perfluorinated polyether is in the range of from 800 to 4,000, L is the bivalent residue derived from trimethylhexamethylene diisocyanate (TMHMDI) and Q is the residue derived from isocyanatoethyl methacrylate. It is particularly preferred that the molecular weight of the perfluorinated polyether is about 2,000 and the molecular weight of M is about 1,000.

A preferred macromonomer of the present invention is of formula (19):

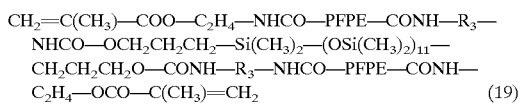
(19)

wherein

PFPE is of formula (1), x in formula (1) is 10 and y is 12, and $R_3$ is the trimethyhexamethylene component of TMHMDI (trimethylhexamethylene diisocyanate).

The polymers of the invention may be composed of one or more than one different macromers, for example, of formulae (4), (5) or (6).

The PFPE macromonomers of the invention and their synthesis are known e.g. from PCT applications WO 96/31546 or WO 97/35906.

A suitable charged monomer which may be introduced in the copolymerization reaction, is, for example, represented by formula

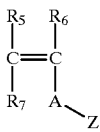
(2a)

wherein for $R_5$, $R_6$, $R_7$, A and Z the above-given meanings and preferences apply. A suitable polymerizable precursor of a charged monomer precursor is represented, for example, by formula

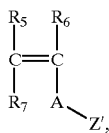

(2b)

wherein for $R_5$, $R_6$, $R_7$ and A the above-given meanings and preferences apply, and Z' is, for example, an aliphatic, cycloaliphatic or heterocyclic moiety comprising a reactive group, for example a hydroxy group, an amino group or a protected amino group, in particular a group —NRR' or —NR—C(O)O—tert.—butyl, wherein for R and R' the above given meanings and preferences apply. A preferred group of monomers of the formula (2b) is represented by the formula

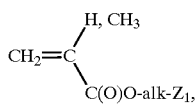

(2b')

wherein
  $Z_1$ is hydroxy or an amino or protected amino group, in particular a radical —NRR' or —NR—C(O)O—tert.—butyl, and for alk, R and R' the above-given meanings and preferences apply in each case.

The components of the formula (2b) or (2b') may be converted into a charged form either before or after the polymerization reaction, for example, by an acid treatment or quaternization of the amino group with an alkyl halide, optionally after removal of the protective group. Zwitterionic moieties are obtained, for example, by quatemizing the amino group with a compound comprising an anionic group such as —COOH, —SO$_3$H, —OSO$_3$H or —OPO$_3$H$_2$ or a suitable salt thereof. Suitable quaternization reagents are, for example, alkyl sultones such as propyl sultone or haloalkyl carboxylic acids such as iodo acetic acid. Components of formula (2b) or (2b') comprising a radical Z' that contains a hydroxy or amino group may also be converted into a charged form, for example, by coupling said hydroxy or amino group with a pre-existing charged compound, for example with a zwitter-ionic compound such as an amino acid including peptides and proteins.

The charged monomers of the invention are known compounds or may be obtained according to processes known per se. For example, the zwitter-ionic monomers may be obtained in situ just before the polymerization reaction by reacting a compound of the above formula (2b') wherein $Z_1$ is an amino group with a suitable quatemization reagent, for example an alkyl sultone or haloalkyl carboxylic acid.

In the preferred composition of the novel copolymers, the proportion by weight of the PFPE macromonomer(s) is in the range of 99.5 to 70%, in particular in the range of 98 to 80%, preferably in the range of 98 to 85% and most preferably in the range of 97 to 90%, based on the total of polymerizable components. The proportion of the zwitter-ionic monomer is, for example, in the proportion of 0.5 to 30%, in particular 2 to 20%, preferably 2 to 15% and most preferably 3 to 10% by weight, based on the total of polymerizable components.

In addition to the PFPE macromonomer(s) and the zwitter-ionic monomer or its precursor, further comonomers comprising one or more ethylenically unsaturated groups may be incorporated into the polymerization mixture which can enter into a reaction to form the copolymers of the invention. It is preferred that the ethylenically unsaturated group be selected from the group consisting of acryloyl, methacryloyl, styryl, acrylamido, acrylamidoalkyl, or urethanemethacrylate, or any substituted derivatives thereof.

A comonomer present in the novel polymer can be hydrophilic or hydrophobic or a mixture thereof. Suitable comonomers are, in particular, those which are usually used in the production of contact lenses and biomedical materials. A hydrophobic comonomer is taken to mean a monomer which typically gives a homopolymer which is insoluble in water and can absorb less than 10% by weight of water. Analogously, a hydrophilic comonomer is taken to mean a monomer which typically gives a homopolymer which is soluble in water or can absorb at least 10% by weight of water.

Suitable hydrophobic comonomers are, without limitation thereto, $C_1$–$C_{18}$ alkyl and $C_3$–$C_{18}$ cycloalkyl acrylates and methacrylates, $C_3$–$C_{18}$ alkylacrylamides and -methacrylamides, acrylonitrile, methacrylonitrile, vinyl $C_1$–$C_{18}$ alkanoates, $C_2$–$C_{18}$ alkenes, $C_2$–$C_8$ haloalkenes, styrene, (lower alkyl)styrene, lower alkyl vinyl ethers, $C_2$–$C_{10}$ perfluoroalkyl acrylates and methacrylates and correspondingly partially fluorinated acrylates and methacrylates, $C_3$–$C_{12}$ perfluoroalkylethylthiocarbonylaminoethyl acrylates and methacrylates, acryloxy- and methacryloxyalkylsiloxanes, N-vinylcarbazole, $C_1$–$C_{12}$ alkyl esters of maleic acid, fumaric acid, itaconic acid, mesaconic acid and the like.

Preference is given, for example, to acrylonitrile, $C_1$–$C_4$ alkyl esters of vinylically unsaturated carboxylic acids having 3 to 5 carbon atoms or vinyl esters of carboxylic acids having up to 5 carbon atoms.

Examples of suitable hydrophobic comonomers are methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethyl-thiocarbonylaminoethyl methacrylate, isobomyl methacrylate, trifluoroethyl methacrylate, hexafluoroisopropyl methacrylate, hexafluorobutyl methacrylate, tristrimethylsilyloxysilylpropyl methacrylate (hereinafter: Tris methacrylate), tristrimethylsilyloxysilylpropyl acrylate (hereinafter: Tris acrylate), 3-methacryloxy propylpentamethyldisiloxane and bis(methacryl-oxypropyl) tetramethyldisiloxane.

Preferred examples of hydrophobic comonomers are methyl methacrylate, Tris acrylate, Tris methacrylate and acrylonitrile.

Suitable hydrophilic comonomers are, without this being an exhaustive list, hydroxyl-substituted lower alkyl acrylates and methacrylates, acrylamide, methacrylamide, (lower alkyl)acrylamides and -methacrylamides, ethoxylated acrylates and methacrylates, hydroxyl-substituted (lower alkyl) acrylamides and -methacrylamides, hydroxyl-substituted lower alkyl vinyl ethers, N-vinylpyrrole, N-vinyl-2-pyrrolidone, 2-vinyloxazoline, 2-vinyl-4,4'-dialkyloxazolin-5-one, 2- and 4-vinylpyridine, allyl alcohol and the like. Preference is given to N-vinyl-2-pyrrolidone, acrylamide, methacrylamide, hydroxyl-substituted lower alkyl acrylates and methacrylates and hydroxy-substituted (lower alkyl) acrylamides and -methacrylamides Examples of suitable hydrophilic comonomers are hydroxyethyl methacrylate (HEMA), hydroxyethyl acrylate, hydroxypropyl acrylate, acrylamide, methacrylamide, N,N-dimethylacrylamide (DMA), allyl alcohol, vinylpyridine, glycerol methacrylate, N-(1,1-dimethyl-3-oxobutyl) acrylamide, N-vinyl-2-pyrrolidone (NVP), and the like.

Preferred hydrophilic comonomers are 2-hydroxyethyl methacrylate, N,N-dimethylacrylamide and N-vinyl-2-pyrrolidone.

As stated hereinbefore, suitable comonomers include fluorine- and silicon-containing alkyl acrylates and hydrophilic comonomers, which may be selected from a wide range of materials available, and mixtures thereof. Particularly preferred comonomers include dihydroperfluoroalkyl acrylates, such as dihydroperfluorooctyl acrylate and 1,1-dihydroperfluorobutyl acrylate, trihydroperfluoroalkyl acrylates, tetrahydroperfluoroalkyl acrylates, tris (trimethylsilyloxy)propyl methacrylate or acrylate, and amine-containing comonomers, such as N,N-dimethylaminoethyl methacrylate, N,N-dimethylacrylamide and N,N-dimethyl-aminoethyl-acrylamide. The preferred range for addition of individual comonomers into the formulation is from 0 to 60% by weight and most preferably 0 to 40% by weight of the formulation. In a preferred embodiment of the invention the polymers are prepared in the absence of a comonomer.

A polymer network can, if desired, be reinforced by addition of a crosslinking agent, for example a polyunsaturated crosslinking comonomer. Examples of typical crosslinking comonomers are allyl (meth)acrylate, lower alkylene glycol di(meth)acrylate, poly(lower alkylene) glycol di(meth)acrylate, lower alkylene di(meth)acrylate, divinyl ether, divinyl sulfone, di- and trivinylbenzene, trimethylolpropane tri(meth)acrylate, pentaerythritol tetra(meth) acrylate, bisphenol A di(meth)acrylate, methylenebis(meth) acrylamide, triallyl phthalate and diallyl phthalate.

If a crosslinking comonomer is used, the amount used is in the range of from 0.05 to 20% of the expected total weight of polymer, preferably the comonomer is in the range of 0.1 to 10%, and more preferably in the range of 0.1 to 2%. Preferably the polymerization mixture does not contain a crosslinking monomer.

The polymers of the invention may be obtained by copolymerizing one or more PFPE macromonomers, one or more charged monomers or a suitable precursor thereof and optional further comonomers and/or additives to afford a transparent polymer in the presence of a suitable initiator. Standard methods well known in the art for effecting polymerization may be utilized, with free radical polymerization being preferred. Free radical polymerization can be simply carried out by radiating (using ultra-violet light) monomer mixtures containing a UV initiator, such as benzoin methylether, in an appropriate container or vessel. The mixture is irradiated for a sufficient time to enable polymerization between monomers to take place.

Alternatively, thermal initiation using a thermal initiator such as azobisisobutyronitrile, can be employed. If a precursor of the zwitter-ionic monomer is used, the copolymer after the irradiation may be treated with a suitable reagent in order to convert the precursor units into zwitter-ionic units.

The polymerization mixture can be converted to a polymer neat or in the presence of one or more solvents. While the structure of the components of the polymerization mixture has the most significant effect on the resulting modulus, the choice of solvent and comonomer also has an effect. Useful solvents include those selected from the following classes: esters, alcohols, ethers, and halogenated solvents.

Fluorinated solvents are particularly useful and their use in combination with other solvents (in ratios varying from 1:9 to 9:1) from the classes above is especially desirable. Solvent concentrations of between 0–70% w/w, particularly 10–50% w/w in the polymerization mixture are desirable. Preferred solvents include acetates, particularly isopropyl acetate and tert-butyl acetate, 2-(trifluoromethyl)-2-propanol, chlorofluoroalkanes, particularly trichlorotrifluoroethane, and perfluorinated alkanes, such as perfluoro-1,3-dimethylcyclohexane and the like.

The polymers of the invention are preferably used to produce porous substrates. Porosity may be provided by the inherent porosity of the material. Alternatively, pores may be introduced into the polymers by various procedures such as those disclosed in PCT applications WO 97/35905 or WO 97/35906.

One of the essential distinctive features of porous polymers made from a copolymer of the invention is that they have a water content when fully swollen in water which is higher than that of the same polymer if polymerized under conventional conditions. This definition is to be understood in the context of this invention in that the claimed porous polymers do have their porosity, and the higher water content resulting therefrom, in the absence of any mechanical process steps following the polymerization step, such as mechanical drilling or etching steps. "Conventional conditions" is understood to mean those conditions which have been disclosed already for polymerization of polymers comprising perfluoropolyether units. In order to further illustrate the "conventional conditions" it is to be understood that said conditions most preferably exclude any porosity promoting conditions, while porosity promoting conditions are chosen for making the porous polymers of the present invention.

Such porosity promoting conditions are, essentially, use of porogens during polymerization, polymerization starting from co-continuous microemulsions, or selection of a solvent which forms a homogeneous solution with the components to be polymerized, but displays the effect of forming a discrete phase during or at the end of the polymerization which discrete organic solvent phase forms an interpenetrating network throughout the mixture or is dispersed through the mixture. In contrast thereto, the "conventional conditions" referred to hereinbefore and hereinafter, define essentially a polymerization process which is conducted starting from a homogenous phase, e.g. from a homogenous solution in an organic solvent of the components to be polymerized, which phase remains a homogenous phase (then the polymer formed is a soluble polymer), or which homogenous phase is transformed into a solvent phase and, separately therefrom, a continuous polymer phase at the end of the polymerization (then the polymer formed is a polymer which is unsoluble in the chosen solvent).

The water contents of the porous polymers of the invention, when fully swollen in water, is for example from 5 to 60% by weight, preferably from 10 to 60% by weight, even more preferably from 20 to 55% by weight and particularly preferably from 25 to 50% by weight.

The porous polymers of the invention may be obtained according to a process comprising the steps of:
  i) forming a mixture comprising a polymerizable component and an organic solvent wherein the polymerizable component comprises at least one PFPE macromonomer and one charged monomer;
  ii) polymerizing said mixture wherein immediately after the polymerization of said mixture at least a substantial proportion of said organic solvent is in the form of a discrete phase and wherein said discrete organic solvent phase forms an interpenetrating network throughout the mixture or is dispersed throughout the mixture; and iii) removing the discrete organic solvent phase. This process is referred to hereinafter as method A.

Another suitable process for producing the porous polymers of the invention comprises the steps of:

i) dispersing a porogen in a continuous phase of a polymerizable component wherein said polymerizable component comprises at least one PFPE macromonomer and one charged monomer, and wherein said porogen is an optionally substituted poly(alkylene)glycol;

ii) polymerising said dispersion; and iii) removing the porogen from the porous polymer. This process is referred to hereinafter as method B.

The further disclosure relating to the process of manufacture relates to both processes, method A and method B, if not specifically referred to otherwise.

The polymerizable component comprises at least one PFPE macromonomer and one charged monomer where the above-given meanings and preferences apply in each case. Other above-mentioned comonomers may be used to provide useful properties in the porous polymer. Where used it is preferred that the comonomers are present in the polymerization component in an amount of from 1 to 60% by weight of the polymerization component, most preferably 2 to 40%.

When the polymerizable component comprises ethylenically unsaturated monomers the polymerization may be initiated by ionizing radiation, photochemically or thermally using a free radical initiator. It is preferred to use a free radical initiator such as benzoin methyl ether, Darocur, azobisisobutyronitrile, benzoyl peroxide, peroxydicarbonates and the like. Particularly preferred photochemical free radical initiators are benzoin methyl ether and Darocur 1173 (registered trademark of Ciba-Geigy AG). Free radicals may be formed from the initiator by thermal or photochemical means; redox initiation may also be used.

It will be appreciated that the "organic solvent" may be a mixture and optionally may contain one or more of a surfactant, water, polar or non-polar materials.

In method A, the organic solvent is preferably a polar solvent and is preferably selected from the group consisting of short chain alcohols, amines, ethers, nitrites, carboxylic acids and ketones, and mixtures thereof. The said short chain alcohols, amines, ethers, nitrites, carboxylic acids or ketones may be cyclic, branched or linear; branched chain compounds are particularly preferred. The number of carbon atoms within the short chain compound may be from 1–12; it is preferred however that the number is from 2–8. Preferred organic solvents are amines having up to 12 carbon atoms, alcohols of up to 12 carbon atoms, ethers of up to 12 carbon atoms, nitriles of up to 12 carbon atoms, carboxylic acids of up to 12 carbon atoms and ketones of up to 12 carbon atoms. More preferred organic solvents are non-fluorinated $C_1$–$C_{12}$-alkanols, such as methanol, ethanol, isopropanol, 3-methyl-2-butanol, cyclohexanol or cyclopentanol, fluorinated $C_2$–$C_8$-alkanols such as trifluorethanol, $C_1$–$C_{10}$-amines, such as 3-hexylamine and isopropylamine, $C_1$–$C_{10}$-ethers, such as diisopropyl ether, $C_1$–$C_{10}$-nitriles, such as acetonitrile, $C_1$–$C_{10}$-carboxylic acids, such as acetic acid, and $C_1$–$C_{10}$-ketones, such as cyclohexanone or p-flurorobenzene methyl ketone, and even more preferred are such solvents having up to 7 carbon atoms. Further preferred are non-fluorinated $C_1$–$C_{10}$-alkanols, fluorinated $C_2$–$C_8$-alkanols, $C_1$–$C_{10}$-amines, diisopropyl ether, $C_1$–$C_{10}$-nitriles, $C_1$–$C_{10}$-carboxylic acids, and $C_1$–$C_{10}$-ketones, and even more preferred are such solvents having up to 7 carbon atoms. Especially preferred as organic solvents are alcohols, including the above preferences.

It is also possible to use as an organic solvent a non-polar solvent, but preferably a polar solvent as specified hereinbefore in mixture with a small amount of a non-polar solvent. Such non-polar solvent may be a hydrocarbon solvent having up to 12 carbon atoms which may be cyclic, branched or linear, and which may be substituted by lower alkyl, lower alkoxy or halogen, such as methyl, ethyl, methoxy, fluoro or chloro. Preferred such non-polar solvents are said hydrocarbon solvents having up to 8 carbon atoms, such as cyclohexane or p-fluoromethoxy benzene. The amount of these non-polar solvents, if not used alone, is preferably up to 25% of the total solvent used, more preferred up to 10% of the total solvent used.

Preferred organic solvents are a $C_1$–$C_3$-alkanol, diisopropyl ether, 3-hexanol, cyclopentanol, 3-hexylamine and isopropylamine and in particular a $C_1$–$C_3$-alkanol such as methanol, ethanol or isopropanol.

In method B, porogens for use in the present invention may be selected from the range of optionally substituted (i.e. unsubstituted or substituted) poly(alkylene)glycols, preferably those having up to 7 carbon atoms in each alkylene unit which may be the same or different. Unsubstituted poly (alkylene)glycols are preferred. Preferably the porogen is one or more poly(lower alkylene)glycol, wherein lower alkylene in this context denotes alkylene of up to 6 carbon atoms, preferably up to 4 carbon atoms, in each alkylene unit. We have found polypropylene glycols particularly preferred porogens in the process of the present invention. The porogens may be of varying molecular weight and are preferably less than 4000 in molecular weight, even more preferred less than 1000 in molecular weight. We have found it preferable for the porogen to be liquid at room temperature. Substituted poly(alkylene)glycols are understood to include poly(alkylene)glycols wherein one or two hydroxy groups have been replaced by an ether group, e.g. a lower alkoxy group, or an ester group, e.g. a lower alkylcarbonyloxy group, such that a substituted poly(alkylene)glycol may be preferably represented by a mono-poly(alkylene)glycol-ether, a di-poly(alkylene)glycol-ether, a mono-(poly) alkylene)glycol-ester, a di-poly(alkylene)glycol ester, or a poly(alkylene)glycol-monoether-monoester.

While polypropyleneglycol is particularly preferred, other polyalkylene glycols such as polyethylene glycols may also be used.

The polymerizable component may be mixed with the organic solvent, or the porogen, respectively, and other optional components by any convenient means. For example the polymerizable component may be mixed with the organic solvent, or the porogen, respectively, and other optional components by shaking or stirring. The order in which the components are added to the mixture is not narrowly critical. The various components which make up the polymerizable component do not need to be combined prior to incorporation in the mixture. The mixture may be in the form of an homogeneous solution or may have the organic solvent or the porogen, respectively, as a distinct phase, such as in the form of a dispersion, microemulsion or preferably a co-continuous microemulsion. In method A, the form of the mixture prior to polymerization is not narrowly critical since it is the form of the mixture during polymerization which controls the morphology of the porous polymer.

The mixture may be in the form of a microemulsion. Microemulsions are thermodynamically stable and essentially transparent two phase systems which are usually stabilised by an interfacial layer of surface-active agents. Microemulsions typically consist of uniform and spherical droplets dispersed in a continuous medium. The particle size is typically of the order of $10^{-2}$ microns. Microemulsions may also exist in a co-continuous structure wherein each phase exists as a continuous interpenetrating network within the other phase.

In method A, minor amounts of property modifying components may optionally be added to the mixture before polymerization. For example, other solvents may be added. Suitable other solvents include ethyl acetate, dimethyl formamide, water and fluorinated alcohols. In most cases such solvents are added to reduce viscosity of the solution or to make the solution easier to dispense, for example into molds.

In method B, minor amounts of property modifying components may optionally be added to the mixture before polymerization. For example, solvents may be added. Suitable solvents include short chain alcohols, amines or ethers, as well as ethyl acetate, dimethyl formamide, water and fluorinated alcohols. In most cases such solvents are added to reduce viscosity of the solution or to make the solution easier to dispense, for example into molds. The short chain alcohols, amines or ethers may be cyclic, branched or linear; branched chain compounds are particularly preferred. The number of carbon atoms within the short chain compound may be from 1–12; it is preferred however that the number is from 2–8. Isopropyl alcohol, diisopropyl ether, 3-hexanol, cyclopentanol, 3-hexylamine and isopropylamine are particularly preferred.

Surfactants, preferably fluorinated surfactants, may be incorporated into the mixture. The use of surfactants is an effective means of controlling the size and density of the pores. Non-ionic surfactants containing fluorine are preferred. Particularly preferred surfactants include commercially available fluorinated surfactants such as Zonyl (DuPont) and Fluorad (3M). Zonyl surfactants, which are made of a perfluorinated hydrophobic tail and hydrophilic poly(ethylene oxide) head group, are a particularly preferred surfactant for use in the process of the present invention.

Another type of compound which may act as a surfactant in the context of this invention are macromonomers of formula II as disclosed herein. These compounds are disclosed in more detail in International patent application No. PCT/EP96/01256, the relevant disclosure of which, including the preferences thereof, is incorporated herein.

The mixture may be polymerised by any convenient method generally as described above with reference to the initiation of the polymerizable component. Suitable polymerization conditions will be apparent to those skilled in the art. For example, temperatures may range from –100 to 350°C. and pressures may range from below atmospheric to above atmospheric.

In method A, immediately after polymerization it is essential that a substantial proportion of the organic solvent is in the form of a discrete phase. The discrete organic solvent phase may be in the form of an interpenetrating network throughout the polymerized component or may be dispersed as droplets throughout the polymerized component.

Still in method A, it will be understood that by "a substantial proportion of the organic solvent is in the form of a discrete phase" we mean that there is sufficient organic solvent phase to form either an interpenetrating network of organic solvent phase or a dispersion of organic solvent phase. It will be understood by the person skilled in the art that depending on the polymerization component and the organic solvent a proportion of organic solvent may be adsorbed or retained in the polymerization component and eventually in the porous polymer. Typically more than 60% of the organic solvent is in the form of a discrete phase immediately after polymerization. It is preferred that greater than 80% of the organic solvent is in the form of a discrete phase, more preferably greater than 95% of the organic solvent is in the form of a discrete phase.

In method B, it will be understood that by "a substantial proportion of the porogen remains in the form of a discrete phase" we mean that there is sufficient porogen to form either an interpenetrating network or a dispersion. It will be understood by the person skilled in the art that depending on the polymerization component and the porogen a proportion of porogen may be adsorbed or retained in the polymerization component and eventually in the porous polymer. Typically more than 60% of the porogen is in the form of a discrete phase immediately after polymerization. It is preferred that greater than 80% of the porogen is in the form of a discrete phase, more preferably greater than 95% of the porogen is in the form of a discrete phase.

It is particularly preferred that the organic solvent phase, or the porogen, respectively, forms an interpenetrating network in the polymerization component resulting in the porous polymer having a reticulated porous morphology. The reticulated porous morphology may be an open-cell, sponge-like structure consisting of interconnected polymer globular particles or may have an open-cell structure with an array of interconnected generally spherical pores.

In another preferred embodiment the porous polymer may be in the form of a closed-cell structure with discrete pores dispersed throughout the polymer.

The organic solvent, or the porogen, respectively, may be removed from the porous polymer by any convenient means. Suitable means for removal of solvent, or the porogen, respectively, include evaporation, solvent extraction, washing or leaching.

The process of the present invention is useful for generating materials of various pore sizes and morphologies. The upper limit of average pore size of individual pores is about 5 microns, with 100 nanometres being typical, while pores of around 10 nanometres in diameter may also be obtained.

The pores may form an interpenetrating network. It is more useful to characterise these morphologies in terms of permeability to molecules of defined molecular weight. A typical procecure for handling the porous polymers, once polymerized, and for characterization of morphology in terms of permeability to molecules such as bovine serum albumin, inulin and glucose is described in PCT application WO 96/31548.

The morphology and porosity of the porous polymer may be controlled by altering the ratio of the organic solvent, or the porogen, respectively, to the monomer. At high ratios of organic solvent, or the porogen, respectively, an open sponge-like structure consisting of interconnected polymer globular particles is obtained. At lower ratios, a reticular network of pores is obtained. At even lower ratios a closed-cell morphology is obtained.

In method A, we have found that ratios of polymerizable component to solvent of about 1:1.3 result in the porous polymer having an open sponge-like structure consisting of interconnected polymer globular particles. At ratios of about 1:0.5 the porous polymer generally has a reticular network of pores. At ratios of about 1:0.1 the porous polymer generally has a closed-cell morphology.

Particularly useful embodiments of the present method have the organic solvent phase, or the porogen phase, respectively, in the form of a continuous interpenetrating network structure which may be readily extracted to leave a porous PFPE material having a reticular network of pores allowing ready passage of fluid and small diameter particles through the porous polymer.

The size and density of the pores may be controlled by the ratio of the polymerizable component to organic solvent. Minor changes can be effected by the use of surfactants as hereinabove described. The addition of a minor proportion of water also increases porosity.

With suitable selection, the resultant copolymers are optically transparent, having a refractive index that provides a good match with aqueous media, tissue and cellular material. As a result the copolymers of the invention are ideal for use as an ophthalmic device or a ocular prostheses, such as a corneal onlay or implant.

A further embodiment of the invention relates to mouldings that are composed of a polymer comprising one or more perfluoroalkylpolyether units and one or more charged units as defined above. Suitable mouldings are, for example, biomedical devices, e.g. ophthalmic devices such as contact lenses, intraocular lenses or artificial cornea comprising a polymer of the invention.

The polymers produced according to the present invention may be formed into other useful articles using conventional moulding and processing techniques as are well known in the art. Given the visual transparency of the polymers of the present invention, they may find use in tissue culture apparatus, optical instruments, microscope slides and the like.

A further aspect of this invention is the use of the polymers of the invention in film or sheet form as a membrane or a filter. Such polymer films may be laminated with another support film to form a composite. Such applications may involve permeability to gases or liquids.

The polymers of the present invention may be suitable for use as a membrane having a variety of applications including industrial membranes, capacitors, home reverse osmosis, implanted glucose monitors, encapsulated biological implants e.g. pancreatic islets, drug delivery patches, membrane distillation using osmotic pressure, sustained release of active compounds, immobilised ligands for use in bioreactors or biosensors. Other applications include wound healing dressings, biotechnology and biomedical applications including vascular grafts, and ultrafiltration in the food, dairy, juice, low alcohol beer industries.

The polymers of the invention, in particular the porous ones, are highly biocompatible with living tissue and support the attachment and growth of human or animal cells in vivo or in vitro. The polymers of the invention furthermore show a high oxygen permeability, permeability to proteins and nutrients and optical transparency in vivo. A further advantage of the polymers of the invention relates to the very low tendency to accumulate deposits such as protein or lipid deposits on their surface in vivo.

The polymers of the invention are therefore particularly useful as medical implants (such as implantable semipermeable membrane materials, tissue implants in cosmetic surgery, implants containing hormone secreting cells such as pancreatic islet cells, breast implants, artificial joints, and the like), in artificial organs, tissue culture apparatus (such as bottles, trays, dishes and the like), in biological reactors (such as those used in the production of valuable proteins and other components by cell culture), as material for the fabrication of medical devices or as coating on existing medical devices such as vascular grafts, catheters, artificial pancreas and the like, or as material for ophthalmic devices, such as contact lenses, intraocular lenses or artificial cornea, or ocular prostheses, such as corneal implants.

Ocular prostheses, such as corneal implants, may be made by copolymerization of the polymerizable components in moulds and, optionally, the resultant copolymer may be fabricated or machined to the desired conformation. Ocular prostheses may be made by other methods which are well known per se to those skilled in the art. Porosity may be provided as described above.

Corneal implants may be placed by way of conventional surgery techniques onto, into or behind the cornea of a mammal. In particular, the corneal implant is placed beneath, within, or through corneal epithelial tissue, or within the corneal stroma or other tissue layers of the cornea. Such implants may change the optical properties of the cornea (such as to correct visual deficiencies) and/or change the appearance of the eye, such as pupil coloration. A corneal implant may comprise an optical axis region which on implantation covers the pupil and provides visual acuity, and a less transparent region which surrounds the periphery of the optical axis region. Alternatively the implant may have the same visual acuity across its dimensions.

It has been found that the flow of high molecular weight tissue fluid components such as proteins and glycoproteins (for example, growth factors, peptide and protein hormones, and proteins associated with the transport of essential metals) and the like across a corneal implant, that is, between epithelial cells and stromal cells and even the endothelial layer and beyond, is important for long term maintenance and viability of tissue anterior and posterior to a corneal implant. Accordingly the corneal implant is advantageously prepared with a porosity sufficient to allow passage therethrough of tissue fluid components having a molecular weight greater than about 10,000 daltons, thereby providing for a flux of tissue fluid components in addition to small molecular weight nutrients (such as glucose, fats and amino acids) and respiratory gases between cells anterior of the implant and cells posterior thereof.

Preferably a corneal implant has a porosity sufficient to admit proteins and other biological macromolecules of a molecular weight up to and greater than 10,000 daltons, such as from 10,000 to 1,000,000 daltons, but not sufficient to admit cells and thus tissue invasion into the optical axis region of the corneal onlay. Where porosity of the implant is provided by pores, the optical axis region comprises a plurality of pores, the number of which is not in any way limiting, but which is sufficient to provide flow of tissue components between the anterior and posterior regions of an implant. Preferably, the pores formed within the optical axis region do not cause refraction of visible light to an extent that would cause any problem with regard to vision correction. It is to be understood that the term pore does not put any geometric limitation on the nature of the pores which may be of regular or irregular morphology. It should be recognized that not all pores may be of the same diameter.

Outside of the optical axis region, the corneal implant may have the same porosity as the optical axis region. Alternatively, this region of the implant surrounding the periphery of the optical axis region, which may be referred to as the skirt, may allow the ingrowth of cells of the cornea thereby assisting in anchorage of the implant to the eye.

Porosity in the skirt may be an inherent feature of the material from which the skirt is formed. In this regard it is to be appreciated that the skirt may be formed of the same material as the optical axis region and may be integral therewith. In this situation, pores of differing diameter may be formed in the optical axis region and the skirt.

Alternatively, the skirt may be formed of a different material from the optical axis region, which material is of a higher porosity than the optical axis region so as to allow this tissue ingrowth. Preferably the skirt may be comprised of an optically transparent polymer as is the optical axis region, but alternatively, the skirt may be comprised of an optically non-transparent material or may be made of a porous material that is not optically transparent.

The copolymers of the invention themselves can be coated with substrates such as collagen with increased efficiency (over a polymer without zwitter-ionic units) due to the presence of the zwitter-ionic groups at the polymer interface.

The present invention is further described in the following non-limiting examples. If not otherwise specified, all parts are by weight. Temperatures are in degrees Celsius. Molecular weights of macromers or polymers are number average molecular weights if not otherwise specified.

EXAMPLES 1–8

The following formulations are prepared by mixing the components in the order down the Table. The samples are mixed well, prior to the addition of the photoinitiator, in a glass sample vial furnished with a stirrer. After the addition of the photoinitiator (Darocur 1173), the mixing is continued for a further five minutes. The resulting solution is then placed in polypropylene moulds and polymerised for 3 hours under the irradiation of broad spectrum UV lamps (1 mW/cm$^{31}$ $^1$). All parts are by weight.

Zwitter-ion (1)=a 50% (w/w) mixture of the compound $CH_2=C(CH_3)—C(O)O—(CH_2)_2—N(CH_3)_2{}^+—(CH_2)_3—SO_3{}^-$ in methanol;

Zonyl FSN=non-ionic fluorinated surfactant (DuPont);

Darocur 1173=photoinitiator (Ciba Speciality Chemicals).

The polymers are removed from the mold and placed through a general extraction and drying procedure to remove any unpolymerised components. This procedure consists of a 4 h soaking in a fluorinated solvent such as Vertrel XF (DuPont), TCTFE (Aldrich) or HFE 7100 (3M), then 16 hr immersion in isopropyl acetate and subsequent immersion for 4 h in isopropyl alcohol. After drying in vacuo the polymer takes on a white colour. When the white polymers undergo a graded solvent change from ethanol, 75% ethanol/water, 50% ethanol/water overnight, 25% ethanol/water, then pure water or saline, they become transparent. The graded solvent change has the effect of introducing water into the porous channels of the porous PFPE materials; this occurs despite the very hydrophobic nature of PFPE based materials. The water content of the thus "hydrated" polymers is as follows: 22% (Example 1), 30% (Example 2), 37% (Example 3), 38% (Example 4), 45% (Example 5), 23% (Example 6), 26% (Example 7), 36% (Example 8); all percentages by weight.

The membranes obtained show a high permeability to bovine serum albumin (for measurement see WO 97/35906, Method A) in each case and support a very effective attachment and growth of corneal epithelium cells on the surface (for measurement see WO 96/31548).

| Example | 1 (parts) | 2 (parts) | 3 (parts) | 4 (parts) | 5 (parts) | 6 (parts) | 7 (parts) | 8 (parts) |
|---|---|---|---|---|---|---|---|---|
| Macromonomer (1) | 0.8 | 0.8 | 0.8 | 0.8 | 0.8 | 0.8 | 0.8 | 0.8 |
| Macromonomer (2) | 0.2 | 0.2 | 0.2 | 0.2 | 0.2 | 0.2 | 0.2 | 0.2 |
| Ethanol | 0.3 | 0.4 | 0.52 | 0.5 | 0.7 | 0.3 | 0.3 | 0.5 |
| Zwitter-ion (1) | 0.09 | 0.1 | 0.1 | 0.1 | 0.1 | 0.2 | 0.2 | 0.2 |
| Zonyl FSN | 0.04 | 0.04 | 0.12 | 0.07 | 0.11 | — | 0.06 | 0.12 |
| Darocur 1173 | 0.004 | 0.003 | 0.003 | 0.004 | 0.004 | 0.003 | 0.003 | 0.003 |

Macromonomer (1): perfluorinated macromer of the formula

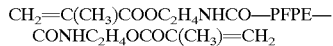

$CH_2=C(CH_3)COOC_2H_4NHCO—PFPE—CONHC_2H_4OCOC(CH_3)=CH_2$ wherein

PFPE is the perfluorinated polyether component of 3M Experimental Product L-12875 being a mixture of perfluorinated polyethers of formula:

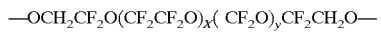

$—OCH_2CF_2O(CF_2CF_2O)_x(CF_2O)_yCF_2CH_2O—$ wherein the $CF_2CF_2O$ and $CF_2O$ units may be randomly distributed or distributed as blocks throughout the chain and wherein x is in the range of from 8 to 10 and y is in the range of from 10 to 14 ($M_w=2000$);

Macromonomer (2): perfluorinated macromer of the formula

$CH_2=C(CH_3)COOC_2H_4NHCO—(—PFPE—CONH—R_{11}—NHCO—)_{0.65}—PFPE—CONHC_2H_4OCOC(CH_3)=CH_2$ wherein PFPE is defined as for Macromonomer (1) above, and $R_{11}$ is the trimethylhexamethylene component of TMH-MDI ($M_w=1000$);

EXAMPLES 9–10b

Membranes having good all-round properties are also obtained by following the procedure described in Examples 1–8 and reacting together, instead of the components used therein, the compounds listed in the following Table, in the amounts indicated.

| Example | 9 (parts) | 10 (parts) | 10a (parts) | 10b (parts) |
|---|---|---|---|---|
| Macromonomer (1) | 0.8 | 0.8 | 3.5 | 4.5 |
| Macromonomer (2) | 0.2 | 0.2 | — | — |
| Ethanol | 0.6 | 0.6 | — | — |
| Trifluoroethanol | — | — | 0.9 | 1.5 |
| Zwitter-ion (2) | 0.12 | 0.24 | — | 0.09 |
| Zwitter-ion (3) | — | — | 0.07 | — |
| Zonyl FSN | — | 0.24 | — | — |
| Darocur 1173 | 0.008 | 0.008 | 0.01 | 0.02 |

Zwitter-ion (2) = the compound $CH_2 = C(CH_3)—C(O)O—(CH_2)_{10}—O—P(O)_2—O—(CH_2)_2—N(CH_3)_3{}^+$
Zwitter-ion (3) = the compound $CH_2 = C(CH_3)—C(O)NH—(CH_2)_3—N(CH_3)_2{}^+—(CH_2)_2—O—P(O)_2—(CH_2)_5—CH_3$ The water content of the thus "hydrated" polymers is as follows: 43% (Example 9), 48% (Example 10), 10% (Example 10a) and 15% (Example 10b).

EXAMPLE 11–12

(Preparation of a Membrane Via a Zwitter-ionic Monomer Percursor)

(a) Membranes are obtained by following the procedure described in Examples 1–8 and reacting together, instead of the components used therein, the compounds listed in the following Table, in the amounts indicated.

| Example | 11 (parts) | 12 (parts) |
|---|---|---|
| Macromonomer (1) | 1. | 1.0 |
| Ethanol | 0.5 | 0.5 |
| DMAEMA | 0.10 | 0.20 |
| Darocur 1173 | 0.008 | 0.008 |

DMAEMA = the compound $CH_2 = C(CH_3)-C(O)-O-(CH_2)_2-N(CH_3)_2$

The compositions are cast in 0.2 mm thick circular polypropylene moulds which are approximately 20 mm in diameter.

(b1) 0.672 g of 1,3-Propanesultone are dissolved in 25 ml of methanol. The dried porous membranes 11 and 12 obtained according to step (a) (weight approximately 0.036 g in each case) are placed in glass sample vials containing 5 ml of the above sultone solution. The vials are sealed and placed into a 37° C. water batch for about 4 hours. The sultone solution is then decanted and the vials are rinsed with water three times. The membranes are finally equilibrated overnight in water. On removal from water the treated membranes are able to retain their water film for significantly longer periods than the untreated precursors 11 and 12 indicating that the hydrophilic zwitter-ion has been generated. This is confirmed by XPS analysis of the sulphur levels in the membranes (11b1 =1,06% S; 12b1=3,22%).

(b2) 0.75 g of iodo acetic acid are dissolved in a mixture of 0.69 g of triethylamine and 25 ml of isopropyl acetate. The dried porous membranes 11 and 12 obtained according to step (a) (weight approximately 0.036 g in each case) are placed in glass sample vials containing 5 ml of the above iodo acetic acid solution. The vials are sealed and placed into a 37° C. water batch for about 4 hours. The iodo acetic acid solution is then decanted and the vials are rinsed with ethanol three times and with water three times. The membranes are then dried and equilibrated in dichloromethane (3 hours) and methanol (3 hours). XPS analysis confirms the presence of the quaternary ammonium ion in the membranes (11b2=1.96% N (=approximately 81% tertiary amine, 19% quatemary amine); 12b2=2.5% N (=approximately 60% tertiary amine, 40% quaternary amine)).

Membranes 11b1, 11b2, 12b1 and 12b2 show a high permeability to bovine serum albumin (for measurement see above) in each case and support a very effective attachment and growth of corneal epithelium cells on the surface (for measurement see above).

What is claimed is:

1. A polymer comprising one or more perfluoroalkylpolyether (PFPE) units and one or more charged units selected from the group consisting of zwitter-ionic units wherein the PFPE units are of formula $$-OCH_2CF_2O\ (CF_2CF_2O)_x(CF_2O)_yCF_2CH_2O- \quad (1)$$

wherein the $CF_2CF_2O$ and $CF_2O$ units may be randomly distributed or distributed as blocks throughout the chain and wherein x and y may be the same or different such that the molecular weight of the perfluorinated polyether is in the range of from 242 to 8000.

2. A polymer according to claim 1, wherein x is from 1 to 20, and y is from 1 to 25.

3. A polymer according to claim 1, wherein the charged units each correspond to formula

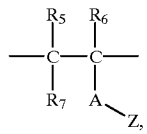

(2)

wherein either
(i) two of the three variables $R_5$, $R_6$ and $R_7$ are hydrogen and the third one is hydrogen, carboxy, carboxymethyl or $C_1$–$C_4$-alkyl; or
(ii) $R_5$ and $R_6$ together with the adjacent carbon atoms form a 5- to 7-membered cycloaliphatic or heterocyclic ring and $R_7$ is hydrogen; or
(iii) $R_5$ and $R_6$ are each hydrogen and $R_7$ and A together with the adjacent carbon atoms form a 5- to 7-membered cycloaliphatic or heterocyclic ring; or
(iv) $R_5$ and $R_7$ are each hydrogen and $R_6$ and A together with the adjacent carbon atom form a 5- to 7-membered cycloaliphatic or heterocyclic ring;
A is a direct bond or a a carbonyl, carbonate, amide, ester, dicarboanhydride, dicarboimide, urea or urethane functional group; and
Z is an aliphatic, cycloaliphatic or heterocyclic moiety comprising one anionic and one cationic group each.

4. A polymer according to claim 3, wherein the cationic group is a monovalent group $-NRR'R''^+$ or a bivalent group $-NRR'^+-$, wherein R, R' and R'' may be the same or different and are each independently of the other hydrogen or $C_1$–$C_{24}$-alkyl, and the anionic group is a monovalent group $-COO^-$, $-SO_3^-$, $-OSO_3^-$, $-OPO_3H^--OPO_2^-OR_{11}$ or bivalent $-O-PO_2^--O-$, wherein $R_{11}$ is $C_1$–$C_{12}$-alkyl.

5. A polymer according to claim 1, wherein the charged units are zwitter-ionic units of formula

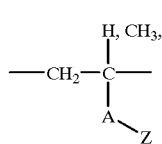

(2a)

wherein
A is a direct bond or a carbonyl, ester or amide functional group, and Z is $C_2$–$C_{12}$-alkyl which is substituted by $-NRR'R''^+$, $-COO^-$, $-SO_3^-$, $-OSO_3^-$, $-OPO_2^-OR_{11}$ or $-OPO_3H^-$ and/or is interrupted by a group $-NRR'^+-$ or $-O-PO_2^--O-$, R, R' and R'' are each independently of the other hydrogen or $C_1$–$C_{12}$-alkyl and $R_{11}$ is $C_2$–$C_8$-alkyl, with the proviso that Z contains one anionic and one cationic group each.

6. A polymer according to claim 5, wherein -A-Z is a radical of formula $$-C(O)O-alk-NRR'^+-alk'-An^- \quad (3a)$$

or

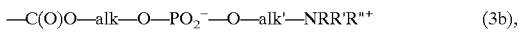    (3b),

R, R' and R" may be the same or different and are each independently of the other hydrogen or $C_1$–$C_{12}$-alkyl, alk and alk' may be the same or different and are each independently of the other $C_1$–$C_{12}$-alkylene, and An⁻ is an anionic group —COO⁻, —SO$_3^-$, —OSO$_3^-$, —OPO$_2^-$OR$_{11}$ or —OPO$_3$H⁻ wherein R$_{11}$ is $C_2$–$C_8$-alkyl.

7. A polymer according to claim 1, wherein the PFPE units are derived from a macromonomer of formula Q-(PFPE-L)$_{n-1}$-PFPE-Q    (4), Q-B-(L-B)$_n$-T    (5), or

Q-PFPE-L-M-L-PFPE-Q    (6), wherein

Q may be the same or different and is a polymerizable group;

PFPE is a divalent residue of formula (1) according to claim 1;

L is a difunctional linking group;

n is at least 1;

each B may be the same or different and is a difunctional block of molecular weight in the range of from 100 to 4000 and wherein at least one B is a perfluorinated polyether of formula (1) according to claim 1;

T is a univalent terminal group which is not polymerisable by free radicals but which may contain other functionality; and M is a residue from a difunctional polymer or copolymer having a molecular weight in the range of from 180 to 6000 and comprising silicone repeat units of formula

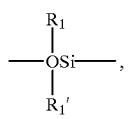    (7)

wherein $R_1$ and $R_1'$ may be the same or different and are selected from the group consisting of hydrogen, alkyl, aryl and halosubstituted alkyl.

8. A polymer according to claim 7, wherein the PFPE units are derived from a macromonomer of formula (4), wherein n is in the range of from 2 to 5, L is a bivalent residue —C(O)—NH—R$_3$—NH—C(O)— of a diisocyanate wherein R$_3$ is alkylene, arylene, alkylenearylene, arylenealkylene or arylenealkylenearylene having up to 14 carbon atoms or a saturated divalent cycloaliphatic group having 6 to 14 carbon atoms, and Q is a compound of formula P$_1$-(Y)$_m$-(R$_2$-X$_1$)$_p$-    (8), wherein P$_1$ is alkenyl of 2 to 4 carbon atoms, Y is —COO—, R$_2$ is alkylene of 1 to 4 carbon atoms, X$_1$ is —NHCO— and m and p are each 1.

9. A polymer according to claim 1, wherein the charged units are derived from one or more different monomers of formula

    (2a)

wherein either
(i) two of the three variables R$_5$, R$_6$ and R$_7$ are hydrogen and the third one is hydrogen, carboxy, carboxymethyl or $C_1$–$C_4$-alkyl; or
(ii) R$_5$ and R$_e$ together with the adjacent carbon atoms form a 5- to 7-membered cycloaliphatic or heterocyclic ring and R$_7$ is hydrogen; or
(iii) R$_5$ and R$_6$ are each hydrogen and R$_7$ and A together with the adjacent carbon atoms form a 5- to 7-membered cycloaliphatic or heterocyclic ring; or
(iv) R$_5$ and R$_7$ are each hydrogen and R$_6$ and A together with the adjacent carbon atom form a 5- to 7-membered cycloaliphatic or heterocyclic ring;

A is a direct bond or a a carbonyl, carbonate, amide, ester, dicarboanhydride, dicarboimide, urea or urethane functional group; and Z is an aliphatic, cycloaliphatic or heterocyclic moiety comprising one anionic and one cationic group each.

10. A polymer according to claim 9, wherein the PFPE macromonomer is present in the polymerization mixture in an amount of 99.5 to 70% by weight, and the charged monomer is present in an amount of 0.5 to 30% by weight, each based on the total of polymerizable material.

11. A process for the preparation of a polymer according to claim 1, comprising the step of copolymerizing one or more macromonomers comprising at least one PFPE unit and at least one polymerizable charged monomer or a precursor thereof, and, if a charged monomer precursor has been used, converting the precursor units into charged units after the copolymerization reaction.

12. A polymer obtained by the process according to claim 11.

13. A polymer according to claim 1, which is porous and has a water contents, when fully swollen in water, which is higher than that of the same polymer if polymerized under conventional conditions.

14. A polymer according to claim 13, wherein the water contents, when fully swollen in water, is from 5 to 60% by weight.

15. A process for the production of a porous polymer according to claim 13, comprising the steps of:
i) forming a mixture comprising a polymerizable component and an organic solvent wherein the polymerizable component comprises at least one PFPE macromonomer and one charged monomer;
ii) polymerizing said mixture wherein immediately after the polymerization of said mixture at least a substantial proportion of said organic solvent is in the form of a discrete phase and wherein said discrete organic solvent phase forms an interpenetrating network throughout the mixture or is dispersed throughout the mixture; and
iii) removing the discrete organic solvent phase.

16. A process according to claim 15, wherein the organic solvent is a $C_1$–$C_3$-alkanol.

17. A process for the production of a porous polymer according to claim 15, comprising the steps of:
  i) dispersing a porogen in a continuous phase of a polymerizable component wherein said polymerizable component comprises at least one PFPE macromonomer and one charged monomer, and wherein said porogen is an optionally substituted poly(alkylene)glycol;
  ii) polymerising said dispersion; and
  iii) removing the porogen from the porous polymer.

18. A process according to claim 17, wherein the porogen is a polyalkylene glycol.

19. A moulding comprising a polymer according to claim 1.

20. A moulding according to claim 19, which is a biomedical device.

21. A moulding according to claim 20, which is a corneal implant.

22. A moulding according to claim 20, which is an ophthalmic device or an ocular prostheses.

* * * * *